United States Patent Office 2,705,441
Patented Apr. 5, 1955

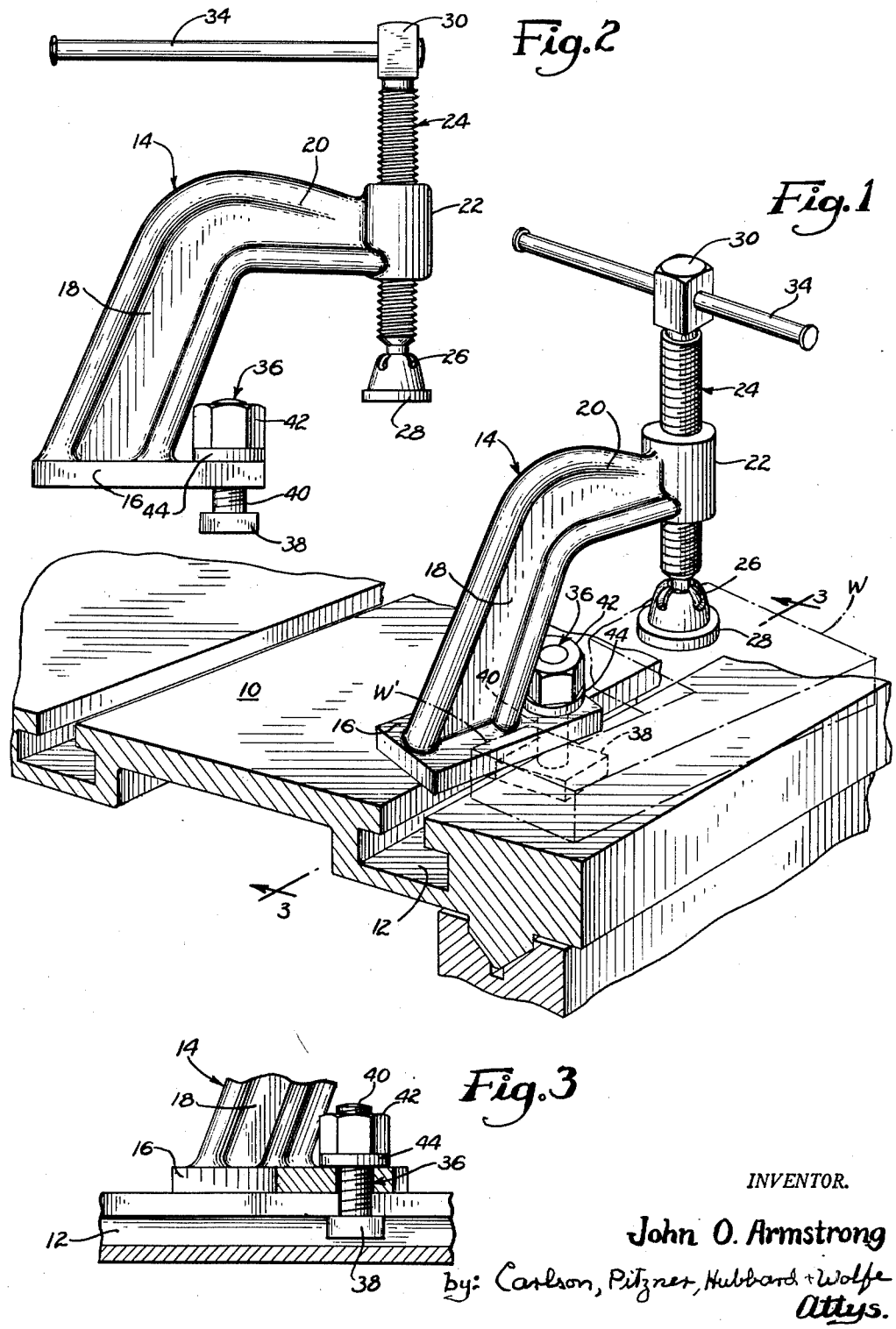

2,705,441

HOLD-DOWN CLAMP

John O. Armstrong, Elmhurst, Ill., assignor to Armstrong Bros. Tool Co., Chicago, Ill., a corporation of Illinois Application March 14, 1951, Serial No. 215,593

1 Claim. (Cl. 90—59)

The present invention relates to means for clamping a workpiece upon the work-support or table of a machine tool, the latter term being used herein in its broadest sense to embrace a large variety of machines designed to perform shaping operations upon a workpiece, with or without the removal of metal therefrom.

Heretofore, in drill press or other machine tool operations, it has been customary to clamp the workpiece to the table or work-support of the machine tool, either by a C-shaped clamp which is positioned so as to embrace both the table and the workpiece, or to employ a clamp having a foot portion and an upstanding standard including an overlying arm which provides a support or reaction member for a rotary clamping screw which is adapted to be tightened against the workpiece. The foot portion is adapted to be slidably received within the usual T-slots provided in the surface of the work-support or table, so that when the clamping screw is tightened against the workpiece, the foot piece, by a wedging action within the T-slot, maintains the clamp anchored to the worktable against longitudinal shifting movement within the slot.

Both of the clamping means outlined above are possessed of numerous limitations. Where the C-shaped clamping member is employed, it is sometimes, by reason of the shape or size of the workpiece, necessary to use an inconveniently large clamp, since the smaller sized clamp would ordinarily be in the way of the workpiece and interfere with convenient performance of the desired shaping operation. Where the hold-down clamp employs a foot portion designed for sliding movement in the T-slot of the machine tool, it is necessary that the foot portion be accurately machined to fit the T-slot so that there is little or no side play, end play, or tilting movement of the clamp with respect to the surface of the worktable. Furthermore, when such exact machining operations are resorted to, it is sometimes found difficult to effect longitudinal sliding movement of the clamp relative to the T-slot due to binding of the foot portion within the T-slot.

The present invention is designed to overcome the above noted limitations that are attendant upon the use of conventional hold-down clamps and toward this end it contemplates the provision of a hold-down clamp which can readily be mounted upon the table or work-support of the machine and which utilizes the T-slots commonly provided in such tables while permitting angular adjustment of the hold-down clamp relative to the workpiece as well as preventing undesired tilting of the hold-down clamp, and also preventing binding of any portion of the clamp within the T-slots.

The provision of a hold-down clamp of the character briefly outlined above being the principal object of the invention, a further object of the invention is to provide a hold-down clamp wherein, when the clamp is applied to a workpiece on the worktable, a degree of leverage is applied to the base of the clamp in such a manner that the latter is firmly pressed against the surface of the worktable with a degree of pressure which is directly proportional to the degree of pressure applied to the workpiece to firmly maintain the clamp in position against tilting movement.

Another object of the invention is to provide a hold-down clamp having a base portion which may be clamped to the worktable in any desired angular position relative to the workpiece and maintained in its clamped position at all times, i. e., prior to application of the clamp to the workpiece, during clamping of the workpiece, and after the clamping action has been relieved and the workpiece removed from the worktable.

Other objects and advantages of the invention not at this time enumerated will become apparent as the nature of the invention is better understood, and in the accompanying single sheet of drawings forming a part of this specification.

In the accompanying drawings:

Figure 1 is a fragmentary perspective view of a worktable having mounted thereon a hold-down clamp constructed in accordance with the principles of the present invention.

Fig. 2 is a side elevational view of the hold-down clamp.

Fig. 3 is a fragmentary sectional view taken substantially along the vertical plane indicated by the line 3—3 of Fig. 1.

Referring now to the drawings in detail and particularly to Fig. 1, a worktable, bed or analogous part of a metal working machine is designated at 10 and is provided with the usual undercut grooves or T-slots 12 therein to receive the improved clamping means comprising the present invention for securing a workpiece W upon the face of the table.

The improved clamp is designated in its entirety at 14 and involves in its general organization a foot portion 16 which is preferably of rectilinear design and which has projecting upwardly therefrom a generally inverted L-shaped standard including an upwardly and forwardly inclined portion 18 and a substantially horizontal portion 20 both of which are formed by an upright web section and upper and lower transverse laterally extending flanges. The forward end of the horizontal portion 20 is formed with a sleeve 22 through which there extends in threaded relationship a clamping screw 24 which is disposed substantially perpendicular to the upper face of the table 10 when the clamp is operatively mounted thereon.

The lower end of the clamping screw 24 is provided with a ball extension 26 to which there is attached, for universal movement thereon, a self-adjusting clamping foot 28 adapted to bear against the workpiece W. The other and upper end of the screw is provided with any conventional or desired means for turning the screw, as for example, a squared head 30 having associated therewith a slidable hand-lever 34. The workpiece W is shown as resting squarely upon the table 10 and clamped thereagainst by means of the clamping screw 24. The foot portion 16 of the hold-down clamp 14 extends forwardly of the inclined portion 18 of the clamp and underlies the horizontal portion 20 of the standard and terminates in a vertical plane which intersects the horizontal portion 20 of the standard medially thereof. A clamping stud 36 having a squared head portion 38 and a threaded shank 40 passes vertically through the forward regions of the foot portion 16 in substantially vertical alinement with the juncture of the inclined portion 18 and horizontal portion 20. The head portion 38 is adapted to be disposed in the T-slot 12 with the shank 40 of the stud 36 passing upwardly through the foot portion 16 and with the foot portion being clamped against the upper surface of the table 10 by means of a clamping nut and washer assembly 42, 44 respectively.

It will be seen that the horizontal portion 20 of the standard 14 extends a substantial distance forwardly of the front ege of the foot portion 16 and thus the center of clamping action exerted by the clamping screw 24 is well forwardly of the center of clamping action exerted by the clamping stud 36 on the foot portion 16. Thus when the hand-lever 34 is applied to the clamping screw 24 to bring the clamping foot 28 against the workpiece W, a lifting force on the sleeve 22 results. The effect of this lifting force is translated to the base of the foot portion 16 of the hold-down clamp and, because the forward region of the foot portion 16 is securely held by the clamping screw 36 against elevation from the plane of the table 10, the rear region of the foot portion 16 is forced downwardly into engagement with the surface of the table 10 by a first class leverage action. Furthermore, because of the fact that the bottom of the foot portion 16 and the plane surface of the table 10 are machined so as to be substantially flat, the hold-down clamp as a whole is firmly held against tilting movement on the surface of the table 10.

The transverse width of the foot portion 16 is materially greater than the width of the entrance slot leading to the T-slot 12 so that when the longitudinal axis of the foot portion 16 coincides with the axis of the T-slot and the clamp directly overlies the T-slot 12, the edge regions of the foot portion 16 rest squarely on the surface of the table 10 along relatively wide bands at each side of the T-slot. When the clamping screw 24 is thus applied, the foot portion 16 is firmly held against the surface of the table against tilting movement. When the workpiece W is of an irregular nature and in a selected adjusted position presents an obstructing portion such as the portion W1 that ordinarily would prevent the foot portion 16 of the hold-down clamp 14 from being positioned axially with respect to the T-slot 12, the clamping nut 42 may be loosened. The foot portion 16 of the clamp may be then rotated about a vertical axis substantially in alinement with the inner end of the horizontal portion 20 to an angular position with respect to the T-slot 12 wherein it does not interfere with proper positioning of the workpiece W. The hold-down clamp 14 is thus adjustable throughout 360° as measured on the surface of the table 10, and in any desired adjusted position thereof the clamping action of the clamping screw 24 against the workpiece W will effect a sufficient purchase of the foot portion 16 of the hold-down clamp 14 on the surface of the table 10 to hold the same squarely on the table with the axial plane of the standard 18, 20 assuming a vertical position.

The clamping foot 28 is self-centering in that it is possessed of a flat circular bottom face and, since the foot is pivotally mounted for universal movement on the ball extension 26, the flat bottom surface thereof will tend to align itself in face to face relationship with respect to that portion of the workpiece W upon which it bears.

It is obvious that the improved hold-down clamp may be made of various heights and in various sizes so as to accommodate various sizes of work. Furthermore, any desired number of the improved clamps may be mounted on the table in suitable locations so as to hold the workpiece firmly in position.

I claim as my invention:

A hold-down clamp for use on a work support having a T-slot formed therein, said clamp comprising in combination a flat plate-like foot member of rectilinear outline, a standard integrally joined to said foot member at the rear end thereof, said standard including an upwardly and forwardly inclined portion and an integral horizontal portion at the upper end of the latter and extending forwardly therefrom, said inclined portion and horizontal portion including an upright web section having upper and lower laterally extending edge flanges, the forward end of said horizontal portion having a vertical internally threaded sleeve, a clamping screw received in said sleeve and having a clamping foot on the lower end thereof for engagement with a workpiece on the work support and a transverse hand lever at its upper end, said foot member extending forwardly of said inclined portion to a vertical plane intersecting said horizontal portion medially thereof and having a vertical aperture adjacent its forward portion substantially in vertical alinement with the juncture of said inclined portion and horizontal portion of said standard, a clamping stud having a shank portion received in said aperture and a square head on its lower end for insertion in said T-slot, and a nut threadedly received on said shank portion above said foot member for holding said clamp to the work support and upon loosening said nut for permitting angular rotation of said clamp about a vertical axis extending substantially through the juncture of said inclined and horizontal portions, the width of said foot member being substantially greater than the entrance slot of said T-slot so that said foot member will span the entrance slot in all angularly rotated positions.

References Cited in the file of this patent

UNITED STATES PATENTS

| 399,435 | Phillips | Mar. 12, 1889 |
| 2,661,783 | Caston | Dec. 8, 1953 |

FOREIGN PATENTS

| 570,508 | Great Britain | July 10, 1945 |
| 570,518 | Great Britain | July 10, 1945 |
| 571,234 | France | Jan. 30, 1924 |